Dec. 14, 1954   R. K. WILSON ET AL   2,696,967
FLUID SEAL CONSTRUCTION
Filed Sept. 22, 1953

INVENTORS.
ROBERT K. WILSON
EUGENE M. STONER
BY Thomas P. Mahoney
ATTORNEY.

2,696,967

FLUID SEAL CONSTRUCTION

Robert K. Wilson and Eugene M. Stoner, Los Angeles, Calif.

Application September 22, 1953, Serial No. 381,702

10 Claims. (Cl. 251—174)

This invention relates to a fluid seal construction of the type utilized to seal valve surfaces, rotary shafts, and similar elements against leakage of fluid therepast.

In recent times the problem of sealing valves and rotary shafts exposed to the deteriorating action of aromatic fuels has become an extremely serious one since most conventional sealing materials, such as rubber and neoprene, will not resist the action of the aromatic fuels and thus quickly lose their resilience and their ability to present an adequate seal after relatively short periods of exposure to aromatic fuels.

However, this problem has been recently solved by the provision of seals incorporating resilient sealing elements constituted by such thermoplastic materials as tetrafluoroethylene polymer, commercially known under the trademark "Teflon," and a polyamide resin, commercially known under the trade-mark "nylon." However, while resilient sealing elements formed from the aforementioned thermoplastic materials are highly resistant to the deteriorating effect of aromatic fuels, they are possessed of certain physical characteristics which pose serious problems in maintaining uniform sealing contact between the sealing elements and portions of a housing or device in which the sealing elements are incorporated. This is particularly true in the case of tetrafluoroethylene polymer which has a coefficient of expansion approximately three times that of aluminum, creating serious flow and mounting problems, particularly in aluminum housings, which have, prior to the invention of the fluid seal construction of our invention, resulted in limited applications of tetrafluoroethylene polymer for use in sealing elements.

For instance, let it be supposed that a sealing element formed from tetrafluoroethylene polymer is mounted in a housing between two adjacent surfaces. The compressive forces on the portion of the sealing element between the adjacent surfaces causes an initial set in said portion. Heat cycling augments the tendency of the material to set. The set renders the initial pressure on the sealing element ineffective for maintaining the element in sealing relation with said adjacent surfaces. This condition is aggravated by differential expansion between the seal and the adjacent surfaces. In addition, our invention can cope with setting due to chemical action. When such set occurs, the portion of the sealing element disposed between the aforementioned adjacent surfaces shrinks away from said surfaces or other portions of the housing in which said element is located. When the temperature of the fluid returns to normal, the sealing element returns to approximately its original size but the portion of the sealing element disposed between said surfaces will not entirely reassume its original configuration, and leakage between said surfaces and said portion of said sealing element becomes possible.

It is, therefore, an object of our invention to provide a seal construction for incorporation in a fluid-containing housing which includes a resilient sealing element subject to setting and expansion by heat cycling due to various causes, said construction also including a sealing element retainer which is designed to retain said sealing element in juxtaposition to an adjacent surface in said housing, said retainer including an integral, resilient portion engageable with said sealing element to maintain said sealing element in operative relation with said adjacent surface in said housing despite said setting or expansion of said sealing element.

Another object of our invention is the provision in a seal construction of the aforementioned type of a retainer for the sealing element of the construction which is movable in its associated housing between a first position in which the aforesaid resilient portion of the retainer merely supports a portion of the sealing element in operative relation with the adjacent surface of the housing, and a second position in which said resilient portion of the retainer is deflected in a direction away from said surface to bias said resilient portion more securely against said portion of the sealing element disposed between said resilient portion of the retainer and the adjacent surface of the housing.

By the provision of a structure of the aforementioned character in our seal construction, the expansion or setting of the sealing element is accommodated since, when such expansion or setting takes place, deflection of the resilient portion of the retainer in either direction occurs to accommodate the change in size of the portion of the sealing element between the resilient portion of the retainer and the adjacent surface of the housing. Furthermore, if the sealing element does not return to its approximate original size and configuration when it returns to its normal temperature, the resilient portion of the retainer accommodates any inequalities resulting in that portion of the sealing element lying between the resilient portion of the retainer and the adjacent surface of the housing. In this manner the application of the principles of our invention overcomes inherent disadvantages previously encountered in the use of materials otherwise admirably suited by their inherent qualities for sealing applications involving exposure to aromatic fuels.

Another object of our invention is the provision of a seal construction of the aforementioned character in which the resilient portion of the retainer includes a receptacle for receiving spring means to bias the sealing element of the construction into engagement with an adjacent surface to be sealed.

A further object of our invention is the provision of a seal construction including a minimum number of parts which can be easily and quickly assembled in operative position in association with a surface to be sealed and which can be as readily disassembled to permit the replacement of component portions thereof.

Other objects and advantages of our invention will be apparent from the following specification and the accompanying drawing which is for the purpose of illustration only and in which.

Figure 1:
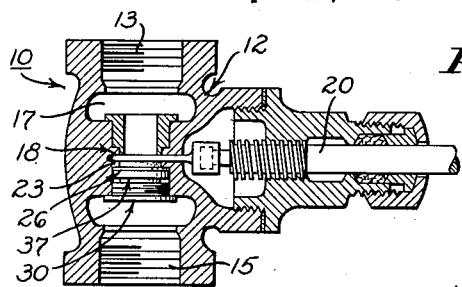
Fig. 1 is a vertical, sectional view of a seal construction of our invention incorporated in a housing for a slide valve.
Figure 2:
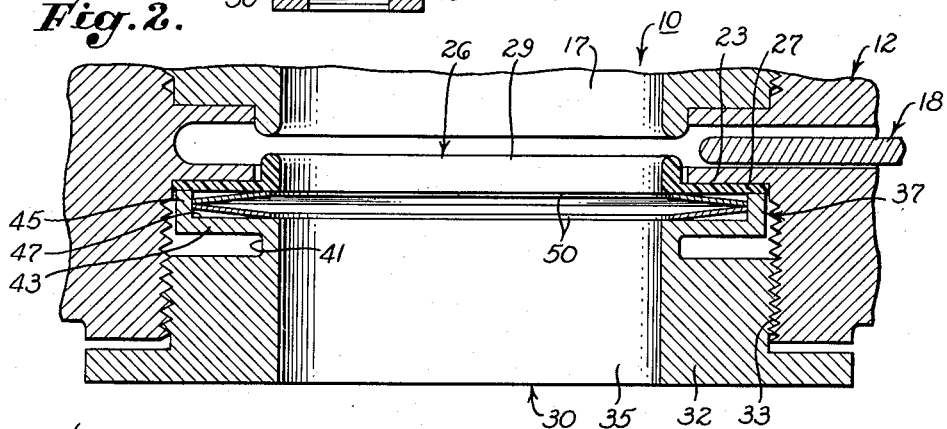
Fig. 2 is a vertical, sectional view of an embodiment of our invention with the retainer thereof disposed in the first position.

Referring to the drawing and particularly to Figs. 1 and 2 thereof, we show a gate valve 10, said gate valve including a housing 12 provided with an inlet passage 13 and an outlet passage 15 communicating with a fluid passage 17 in the interior of the housing 12. The gate valve 10 includes a slide valve 18 which can be retracted from or extended across the fluid passage 17 by means of an actuator 20 secured to an edge thereof. Although the seal construction of our invention will be described as utilized in conjunction with a gate valve 10 of conventional construction, it is obvious, of course, that the principles of our invention can be applied with equally good results to valves of different construction from that shown in Figs. 1-3 of the drawing.

Figure 3:
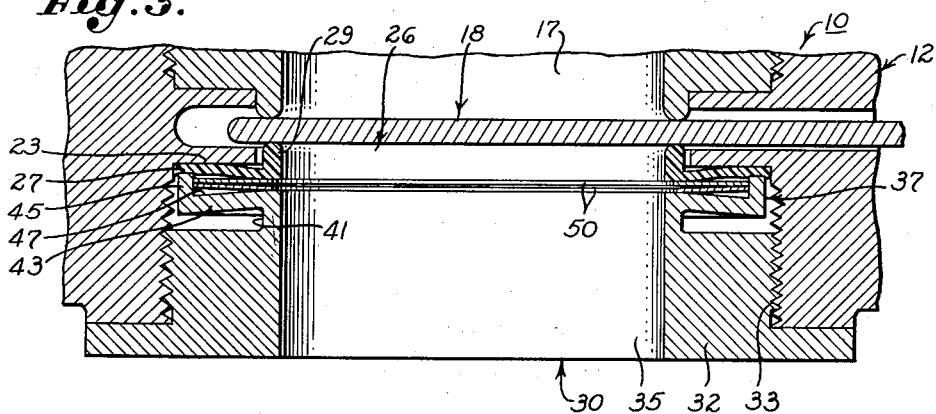
Fig. 3 is a vertical, sectional view of the embodiment of Fig. 2 showing the retainer disposed in the aforementioned section position.

The housing 12 is provided with a flat, annular shoulder 23 which is juxtaposed to the slide valve 18 and which is adapted to serve as a seat for a resilient sealing element 26, preferably formed of "Teflon" (tetrafluoroethylene polymer) or "nylon" (polyamide resin), which has a peripheral, flat, annular portion 27 seated on the shoulder 23 and a centrally located, axially extending annular lip or bead 29 engageable with an adjacent surface of the slide valve 18 in the manner shown in Fig. 3 of the drawing.

The sealing element 26 constitutes a portion of the seal construction indicated generally at 30, said construction including a retainer 32 whose threaded periphery is engageable with a threaded bore 33 adjacent the shoulder 23 in the housing 12. The retainer 32 is provided with a centrally located passage 35 to permit flow of fluid therethrough and includes an integral resilient portion indicated generally at 37, said resilient portion being defined by a deep radial groove 41 formed in the retainer 32 and including a radially extending annular wall 43 and an axially extending annular wall 45 formed integrally therewith. The walls 43 and 45 define a receptacle 47 in the resilient portion 37, said receptacle being designed to receive a pair of superimposed, oppositely oriented Belleville spring washers 50 which bias the annular bead 29 of the sealing element 26 into engagement with the adjacent surface of the slide valve 18 when it is disposed in closed position, shown in Fig. 3 of the drawing.

The retainer 32 of the seal construction 30 is movable from a first position shown in Fig. 2 of the drawing wherein the free edge of the annular wall 45 of the resilient portion 37 of the retainer engages the adjacent portion of the sealing element 26 and the annular wall 43 of said resilient portion is disposed in sustantial parallelism with the adjacent surface of the shoulder 23 of the housing 12. In other words, in the first position the retainer serves merely to support the sealing element 26 on the shoulder 23.

After the accurate location of the sealing element 26 on the shoulder 23 is accomplished by the location of the retainer 32 in the first position, said retainer is then rotated in the bore 33 to carry it into its second position wherein the resilient portion 37, and more particularly the annular wall 43, is deflected in a direction away from the adjacent portion of the sealing element 26 and the adjacent surface of the shoulder 23 to dispose it in a plane which is angularly oriented with respect to the planes of the portion 27 of the sealing element 26 and the surface of the shoulder 23.

When the retainer 32 is thus moved into and located in the second position, the resultant deflection of the resilient portion 32 of said retainer causes considerable bias of the free edge of the wall 45 against the portion 27 of the sealing element 26 engaged thereby. Therefore, when heat cycling of the fluid flowing through the fluid passage 17 causes expansion or setting of the sealing element 26, the wall 45 can deflect in appropriate directions because of the resilient securement of the portion 37 to the body of the retainer 32 thus permitting the portion 27 of the sealing element 26 to expand.

Furthermore, when heat cycling of the fluid reduces the temperature of the fluid and the sealing element 26 returns to approximately its original size and configuration, if any irregularities exist in the portion 27 of the sealing element 26 between the free edge of the wall 45 and the adjacent surface of the shoulder 23, they will be compensated for by the bias of the resilient portion 37 of the retainer 32 into engagement with the portion 27 of the seal 26, thus preventing leakage of fluid past the portion 27 of the element 26.

Therefore, it will be noted that the provision of the seal construction of our invention accomplishes two major functions in that it permits the expansion of the sealing element 26 and compensates for any irregularities in said sealing element after it has returned to its unexpanded state.

In addition, since the resilient portion 37 of the retainer 32 maintains an effective seal on the surface of the shoulder 23, it is unnecessary to provide supplemental gasket means to prevent leakage past the thread on the retainer 32 when the retainer is located in an exposed location on the housing.

It should also be noted, from a study of Fig. 3 of the drawing, how the Belleville spring washers 50 located in the receptacle 47 of the resilient portion 37 of the retainer 32 are deflected into closer contiguity to each other when the slide valve 18 is extended to close the fluid passage 17. Therefore, the Belleville washers 50 serve to maintain the annular bead 29 in continuous engagement with the adjacent surface of the slide valve 18.

It is worthy of note at this juncture that the provision of a seal construction in accordance with our invention also eliminates possible distortion in the component portions of the housing 12 or binding on the valve 18 occasioned by undue expansion of the sealing element 26 which, in prior are devices or constructions, has resulted in permanent injury to the housings and irremediable leakage therefrom.

Figure 4:
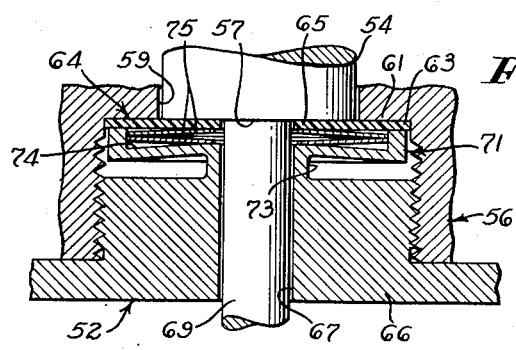
Fig. 4 is a vertical, sectional view of an alternative embodiment of the fluid seal construction of our invention.

An alternative embodiment of our invention is disclosed in Fig. 4 of the drawing, said embodiment being exemplified in a seal construction 52 designed to be utilized in sealing a rotary shaft 54 disposed in a housing 56. The rotary shaft 54 is provided with an annular shoulder 57 which is disposed in a bore 59 in the housing 56, said bore being exposed to fluid within the housing. Formed integrally with the housing 56 is a shoulder 61, said shoulder having an outer portion 63 of a flat, annular, resilient sealing element 64 disposed thereupon. The inner portion 65 of said sealing element 64 engages the shoulder 57 of the shaft 54 to prevent leakage of fluid therepast.

The sealing element 64 constitutes a portion of the seal construction 52 and is maintained in operative relation with the shoulder 61 by means of a retainer or gland nut 66 which also constitutes a component of the seal construction 52. The retainer 66 is provided with a centrally located bore 67 through which extends a shaft extension 69, said retainer also including an integral resilient portion indicated generally at 71 and being defined by a radial groove 73 in the body of the retainer 66. Formed in the resilient portion 71 of the retainer 66 is a receptacle 74 for Belleville spring washers 75, one of which engages the inner portion of the sealing element 64 to bias it into sealing contact with the adjacent shoulder 57 on the shaft 54.

When the retainer 66 is moved into the second position shown in Fig. 4 of the drawing, the resilient portion 71 of the retainer 66 is deflected in the same manner as the resilient portion 37 of the retainer 32 in the previously described embodiment of our invention to maintain a positive sealing relation between the resilient portion 71 of the retainer 66 and the portion 63 of the sealing element 64.

It is, therefore, apparent that by the provision of a fluid seal construction manufactured in accordance with our invention, we eliminate the previously encountered disadvantages inherent in the utilization of "Teflon" and "Nylon" sealing elements in seal constructions. By providing retainer means for the sealing elements having integral resilient portions engageable therewith, we permit both the expansion of the sealing elements when exposed to high ambient temperatures and also accommodate for any irregularities in said sealing elements resulting from the previous expansion thereof. In addition, we eliminate the necessity for frequent dismantling of the devices in which the seal constructions are embodied because the lives of both the housing and the seal construction are materially prolonged.

We claim as our invention:

1. In a seal construction, the combination of: a housing, said housing incorporating a fluid passage and having a sealing element seat encompassing said passage; a movable member disposed in said passage and having a portion contiguous to said seat; a sealing element supported on said seat and engageable with said portion of said movable member to seal said passage against leakage of fluid past said movable member; and a sealing element retainer secured in said housing adjacent said seat, said retainer being substantially cylindrical and having a radial groove therein to provide an integral, resilient portion thereupon engageable with said element for biasing said element into engagement with said seat.

2. In a seal construction, the combination of: a housing, said housing incorporating a fluid passage and having a sealing element seat encompassing said passage; a movable member disposed in said passage and having a portion contiguous to said seat; a sealing element supported on said seat and engageable with said portion of said movable member to seal said passage against leakage of fluid past said movable member; a sealing element retainer secured in said housing adjacent said seat, said retainer being substantially cylindrical and having a radial groove therein to provide an integral, resilient portion thereupon engageable with said element for biasing said element into engagement with said seat, said resilient portion providing a receptacle therein; and spring means in said receptacle for urging said element into engagement with said movable member.

3. In a seal construction, the combination of: a housing having a fluid passage therein and a sealing element seat encompassing said passage; a slide valve in said housing movable across said passage in contiguity to said seat; a sealing element supported on said seat and for engagement with said valve to seal said passage against fluid leakage past said valve; a sealing element retainer secured in said housing, said retainer having a resilient portion engageable with said sealing element to bias said sealing element against said seat, said resilient portion having a receptacle therein; and spring means in said receptacle engageable with said sealing element for urging said sealing element against said valve.

4. In a seal construction, the combination of: a housing, said housing incorporating a fluid passage and having a flat, annular, sealing element seat encompassing said passage; a movable member disposed in said passage and having a portion contiguous to said seat; a sealing element having a flat, annular portion supported on said seat and engageable with said portion of said movable member to seal said passage against leakage of fluid past said movable member; and a sealing element retainer secured in said housing, said retainer having an annular, resilient portion engageable with said flat, annular portion of said element to bias said element into engagement with said seat.

5. In a seal construction, the combination of: a housing, said housing incorporating a fluid passage and having a flat, annular, sealing element seat encompassing said passage; a movable member disposed in said passage and having a portion contiguous to said seat; a sealing element having a flat, annular portion supported on said seat and engageable with said portion of said movable member to seal said passage against leakage of fluid past said movable member; a sealing element retainer secured in said housing, said retainer having an annular, resilient portion engageable with said flat, annular portion of said element to bias said element into engagement with said seat, said resilient portion having a receptacle therein; and spring means in said receptacle engageable with said sealing element to urge said sealing element against said portion of said member.

6. In a seal construction, the combination of: a housing having a fluid passage encompassed by a sealing element seat; a movable member disposed in said passage adjacent said seat; a sealing element supported on said seat having a portion engageable with said movable member; a retainer movable in said housing toward or away from said seat, said retainer having a resilient portion engageable with said sealing element for retaining said sealing element on said seat and a spring receptacle in said resilient portion; and a spring in said receptacle for biasing said sealing element against said movable member.

7. In a seal construction, the combination of: a housing having a fluid passage encompassed by a sealing element seat, said housing having a bore adjacent said seat; a movable member disposed in said passage adjacent said seat; a sealing element disposed on said seat and engaging said movable member; and a sealing element retainer threadedly engaged in said bore and having an integral resilient portion biased toward said seat, said retainer being movable between a first position at the outer end of said bore and a second position in which said resilient portion engages said sealing element and is deflected by contact with said element in a direction away from said seat.

8. In a seal construction, the combination of: a housing having a fluid passage encompassed by a sealing element seat, said housing having a bore adjacent said seat; a movable member disposed in said passage adjacent said seat; a sealing element disposed on said seat and engaging said movable member; a sealing element retainer threadedly engaged in said bore and having an integral resilient portion biased toward said seat, said retainer being movable between a first position at the outer end of said bore and a second position in which said resilient portion engages said sealing element and is deflected by contact with said element in a direction away from said seat, said resilient portion having an annular receptacle therein; and a spring in said receptacle for biasing said element against said member.

9. In a seal construction, the combination of: a housing having a fluid passage encompassed by a flat, annular, sealing element seat, said housing having a bore adjacent said seat; a movable member disposed in said passage adjacent said seat; a sealing element having a flat, annular, peripheral portion disposed on said seat and an inner portion engaging said movable member; a sealing element retainer threadedly engaged in said bore and having an integral resilient portion biased toward said seat, said retainer being movable between a first position at the outer end of said bore and a second position in which said resilient portion engages said sealing element and is deflected by contact with said element in a direction away from said seat, said resilient portion having an annular receptacle therein; and a spring in said receptacle for biasing said element against said member.

10. In a seal construction, the combination of: a housing having a fluid passage encompassed by a flat, annular sealing element seat and a threaded bore adjacent said seat; a movable member adjacent said seat; a sealing element having a flat, annular portion located on said seat and an inner portion engageable with said member; a sealing element retainer threadedly engageable with said bore and having an integral, resilient, annular portion which, when said retainer is fully threaded into said bore, engages said element and is deflected in a direction away from said seat, said resilient portion providing a receptacle therein; and a spring in said receptacle engaging said element.

References Cited in the file of this patent

UNITED STATES PATENTS

| Number | Name | Date |
| --- | --- | --- |
| 2,030,458 | McKeller | Feb. 11, 1936 |
| 2,344,747 | Sperry | Mar. 21, 1944 |
| 2,404,816 | Snyder | July 30, 1946 |
| 2,480,529 | Waag | Aug. 30, 1949 |